United States Patent
Krumenacker et al.

[11] Patent Number: 5,079,761
[45] Date of Patent: Jan. 7, 1992

[54] CIRCUIT ARRANGEMENT FOR A CENTRALLY-CONTROLLED, TIME-DIVISION MULTIPLEX TELEPHONE SWITCHING SYSTEM HAVING A CENTRAL SWITCHING MATRIX NETWORK AND DECENTRALIZED TERMINAL GROUPS

[75] Inventors: Rudolf Krumenacker, Munich; Werner Nagler, Hohenschaeftlarn; Rostislav Kaderka, Germering, all of Fed. Rep. of Germany

[73] Assignee: Siemens Aktiengesellschaft, Munich, Fed. Rep. of Germany

[21] Appl. No.: 490,428

[22] Filed: Mar. 8, 1990

[30] Foreign Application Priority Data

Mar. 17, 1989 [DE] Fed. Rep. of Germany ....... 3908895

[51] Int. Cl.⁵ ............................................. H04Q 11/04
[52] U.S. Cl. ........................................................ 370/58.1
[58] Field of Search ..................... 370/67, 66, 64, 68, 370/58.1, 58.2, 58.3, 63, 59

[56] References Cited

U.S. PATENT DOCUMENTS

| | | | |
|---|---|---|---|
| 4,320,501 | 3/1982 | LeDieu et al. | 370/64 |
| 4,450,557 | 5/1984 | Munter | 370/64 |
| 4,763,316 | 8/1988 | Schaich et al. | 370/16 |
| 4,841,522 | 6/1989 | Yamazaki | 370/64 |
| 4,873,694 | 10/1989 | Schmidt et al. | 370/58 |
| 4,901,347 | 2/1990 | Schmidt et al. | 379/279 |
| 4,905,220 | 2/1990 | Junge et al. | 379/16 |

FOREIGN PATENT DOCUMENTS 0254855 2/1988 European Pat. Off. .
0236779 9/1988 European Pat. Off. .
0291791 11/1988 European Pat. Off. .
0311018 4/1989 European Pat. Off. .

Primary Examiner—Douglas W. Olms
Assistant Examiner—Wellington Chin

[57] ABSTRACT

Terminal groups are connected to a central switching matrix network via time-division multiplex lines and each comprises a switching matrix sub-network and a group controller which are assigned to one another in pairs. In addition to the connection equipment that are individually assigned to the one and to the other of the two terminal groups and that are respectively connected to the switching matrix sub-network of its own terminal group via internal lines during normal operation and that are switchable to the switching matrix sub-network of the respective other terminal group, the time-division multiplex lines individually extending from the central switching matrix network to each of the terminal groups are also switchable from their own terminal group to the respective partner terminal group. Given switch-over operation, in order to make the dial character receivers and call progress tone generators of a terminal group accessible to the internal lines and time-division multiplex lines of the respective other terminal group which is in the switch-over mode, voice memories working for both transmission directions are respectively doubled in the switching matrix sub-network. Call-associated PCM subinformation are always written into both switching matrix sub-networks in concurrent time slots. Reading is always carried out only from that voice memory that is respectively identified by corresponding, call-associated data in the holding memory.

1 Claim, 1 Drawing Sheet

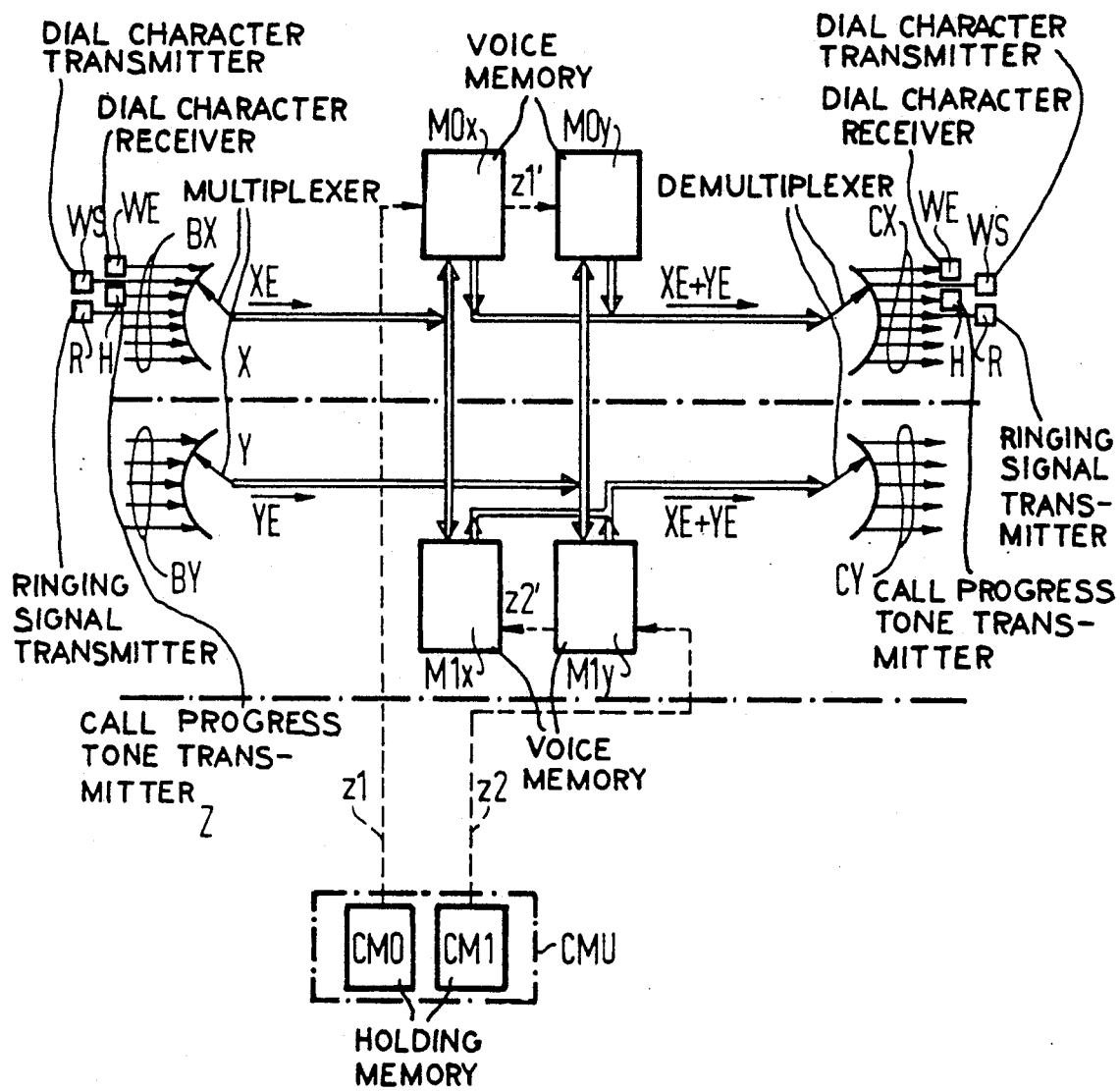

5,079,761

CIRCUIT ARRANGEMENT FOR A CENTRALLY-CONTROLLED, TIME-DIVISION MULTIPLEX TELEPHONE SWITCHING SYSTEM HAVING A CENTRAL SWITCHING MATRIX NETWORK AND DECENTRALIZED TERMINAL GROUPS

BACKGROUND OF THE INVENTION

1. Field of the Invention

The present invention relates to a circuit arrangement for a centrally-controlled, time-division multiplex telephone switching system wherein a central switching matrix network serves for call through-connection together with a central processor which serves for the control thereof, and wherein a plurality of decentralized terminal groups is each equipped with a switching matrix sub-network constructed as a time stage for the external connection of links and subscriber lines and for internal connection of link connecting paths leading to switching matrix network terminals of the central switching matrix network and each group is equipped with a decentralized control device for accepting switching characters from the lines, for preprocessing of switching characters, as well as for forwarding switching characters to the central processor and for sending switching characters onto the lines, and in which the terminal groups are respectively assigned to one another in pairs by two's, and within each of which connector units, for example subscriber lines, multiple subscriber connector circuits, multiple link terminating circuits and the like, serving, on the one hand, for external connection of the subscriber and/or link lines and primarily connected to the switching matrix sub-network within the respective terminal groups can be connected, first of all, to link terminating circuits individually serving for the internal connection of the link connecting paths and likewise primarily connected to the switching matrix sub-network within the appertaining terminal group. On the other hand, the connector units can be additionally connected, first externally and, secondly, internally to the switching matrix sub-network of the respective other cooperating terminal group, i.e. to a respective second terminal group, and vice-versa, whereupon, given a switching mode differing from separate operation of the appertaining, two terminal groups for connections that respectively proceed via a connector unit as well as via a link terminating circuit of the first or, respectively, second terminal group and via the switching matrix sub-network of the other terminal group, the corresponding processing of switching characters, as well as the setting of the switching matrix sub-network, is likewise carried out by the decentralized control device thereof with the assistance of switch elements, for example dial character receivers, dial character transmitters, ringing signal transmitters and call progress tone transmitters that can be occupied in a call-associated manner.

2. Description of the Prior Art

A circuit arrangement of the type set forth above is basically disclosed by the German published application 3 717 387. In a switching system of this type, therefore, the terminal groups are always allocated to one another in pairs. In the switching mode of a respective terminal group, their aforementioned connector units and their aforementioned link terminating circuits are respectively switchable to the switching matrix sub-network of the appertaining cooperating terminal group. By way of the latter, the switching operations are also then executed by way of assistance for that of the two terminal groups allocated to one another which is currently in the switching mode.

Among other things, there are a plurality of switch elements that can be occupied in a call-associated fashion for the call set-up that, among other things, serve the purpose of receiving dial characters and outputting call progress signals and also serve other purposes, as set forth above. Dial character receivers and call progress tone generators are notoriously known in this context. As mentioned, they can be occupied in a call-associated manner.

SUMMARY OF THE INVENTION

In view of the mentioned switching mode for which the switching matrix sub-network of each of the two terminal groups must already be redundantly provided, is the object of the invention to provide that the switch elements can be occupied in a call-associated fashion such as, for example, dial character receivers and call progress tone generators, do not have to be redundantly provided as well. In addition, switch elements that can occupied in a call-associated fashion can also be conference connector sets, test sets and the like. These switch elements that can be occupied in a call-associated fashion of a respective terminal group should be co-utilized when the respective other terminal group, i.e., the corresponding partner terminal group, is situated in a switch-over mode.

The above object is achieved, according to the present invention, in that, in addition to comprising a first pair of time slot switching matrices at whose input side the switch elements that can be occupied in a call-associated fashion are also connected in addition to the connector units and link connector circuits assigned to the appertaining terminal group, the switching matrix sub-network comprises a second pair, per terminal group, of time slot switching matrices to whose input side only the connector units and link connecting circuits allocated to he appertaining partner terminal group, but non of the switch elements, are connected, and in that channel-associated sub-information are doubly written in concurrent time slots, namely parallel into each of he two switching matrix sub-networks of a respective pair, and in that, of each pair of time slot switching matrices, respectively one has its output side connected to the connector units and link connector circuits of the appertaining terminal group as well as to the switch elements thereof that can be occupied in a call-associated fashion and, when reading h sub-information is controlled in a time slot-suited fashion by a fist holding memory assigned thereto, and a respective other time slot switching matrix has its output side connected only the connector units and link connecting circuit of the appertaining partner terminal group and, when reading sub-information, is controlled in a time slot-suited fashion by a second holding memory assigned thereto, whereby each of the two holding memories respectively controls the time slot-associated read events such that a corresponding sub-information per time slot is read either from one or from the other of the appertaining, two switching matrix sub-networks.

BRIEF DESCRIPTION OF THE DRAWING

Other objects, features and advantages and of the invention, tis organization, constructional and operation will be best understood for the following detailed description, taken in conjunction with eh accompanying drawing, one which there is a single figure which is a schematic representation of a circuit arrangement constructed and operating in accordance with the invention.

DESCRIPTION OF THE PREFERRED EMBODIMENTS

Referring to the drawing, it is assumed that the circuit arrangements for centrally-controlled, time-division multiplex telephone switching systems are already notoriously known. In this respect, reference should be taken to the periodical "Telcom Report", Vol. 4, 1981, Supplement "Digitalvermittlungssystem EWFD". Furthermore, the following German published applications should be mentioned in this context: 3 607 903; 3 622 369; and 3 717 387. The German published application 3 733 765 should also be referenced. These published applications disclose circuit arrangements for centrally-controlled, time-division multiplex telephone switching systems wherein a central switching matrix network serving for call through-connection, together with a central processor serving for the control thereof, are provided, and wherein a plurality of decentralized terminal groups is each equipped with a switching matrix sub-network fashioned as a time stage for the external connection of links and subscriber lines and for internal connection of link connecting paths leading to switching matrix network terminals of the central switching matrix network and each equipped with a decentralized control device for accepting switching characters from the lines, for pre-processing of switching characters as well as forwarding switching characters to the central processor and for sending switching characters onto these lines, and in which the terminal groups are respectively allocated to one another in pairs by two's, and within each of which connector units, for example subscriber lines, multiple subscriber connector circuits, multiple link terminating circuits and the like, serving, on the one hand, for external connection of the subscriber and/or link lines and primarily connected to the switching matrix sub-network within the respective terminal groups can be connected, first of all, to link terminating circuits individually serving for the internal connection of the link connecting paths and likewise primarily connected to the switching matrix sub-network within the appertaining terminal group and, on the other hand, can be additionally connected, first externally and, secondly, internally to the switching matrix sub-network of the respective other cooperating terminal group, i.e. to a respective second terminal group, and vice-versa, whereupon, given a switching mode differing from separate operation of the appertaining, two terminal groups for connections that respectively proceed via a connector unit as well as via a link terminal circuit of the first or, respectively, second terminal group and via the switching matrix sub-network of the other terminal group, the corresponding processing of switching characters (as well as the setting of the switching matrix sub-network) is likewise carried out by the decentralized control device thereof with the assistance of switch elements, for example dial character receivers, dial character transmitters, ringing signal transmitters and call progress tone transmitters, that can be occupied in a call-associated fashion. The remainder of this specification proceeds on the assumption that a person skilled in the art is familiar with circuit arrangements of this type. As may be derived from the aforementioned German published application 3 717 387, a switching matrix sub-network is present in each terminal group. The terminal groups are allocated to one another in pairs. The said connector units, on the one hand, and link connector circuits, on the other hand, that are primarily connected to the switching matrix sub-network of the respective same terminal group are connectible to the switching matrix sub-network of the respective partner terminal group in the switch-over mode that differs from the separate operation (normal condition of the appertaining telephone switching system of the appertaining, two terminal groups). To this end, each of the two switching matrix sub-networks of each of the two terminal groups is constructed such that the respective appertaining connector units and the respective appertaining link connecting circuits encounter an adequate plurality of connection possibilities at the switching matrix sub-network of the respective partner terminal group in the switched-over condition. This refers to the plurality of channels that can occupied in a call-associated fashion. The said plurality thus refers to these channels. A switching matrix sub-network in a terminal group thus offers connection possibilities both for the connector units and link connecting circuits of its own terminal group as well as for the connector units and link connecting circuits of the respective partner terminal group, namely for that case wherein the latter is in the switch-over mode. Accordingly, the switching matrix sub-network in each of the terminal groups contains a X part for the connection of the connector units and link connecting circuits of its own terminal group and also contains a Y part for the connection of the connector units and link connecting circuits of the respective partner terminal group. This holds true for each of the two terminal group that are respectively allocated to one another in pairs.

The drawing then shows the switching matrix sub-network of a terminal group. It comprises a X part, a Y part and a Z part. The latter serves the purpose of controlling and among the things contained therein for this purpose is a holding memory CMU. As set forth, the X part serves for the connection of the connector units and the link connecting circuits respectively belonging to the same terminal group, whereas the Y part serves the purpose of connecting the connector units and link connecting circuits of the respective partner terminal group.

A plurality of channels Bx interlaced in one another in terms of time slots are shown for an incoming communications transmission direction, as are corresponding channels CX having time slot-oriented allocation for an outgoing communications transmission direction.

As is known, a respective channel pair is required for each message connection, namely a respective transmission channel for the one communications transmission direction and a respective channel for the other communications transmission direction. Accordingly, a channel at BX and a channel at CX belong to a channel pair that can be occupied in a call-associated fashion. When one channel pair is to be connected to another channel pair via the switching matrix sub-network, then the respective channel at BX of the one channel pair is connected to a channel at CX of the other channel pair, and vice versa, in time-division multiplex-oriented terms. This occurs in a fundamentally known fashion as set forth in the German published application 3 100 811, with the assistance of voice memories that are controlled with the assistance of holding memories. The switching matrix sub-network (for example the sub-network GS1 shown in the published application 3 717 387 that is symbolically shown therein with two connecting sides, namely on the one hand for the connector units and, on the other hand, for the link connecting circuits, is thus fashioned according to the present exemplary embodiment that all connection possibilities (i.e. those at the left-hand side of the latter-mentioned German published application, on the one hand, and, on the other hand, those at the right-hand side therein) are identical to one another. Each of the connection possibilities is realized why a channel pair that can be occupied in a call-associated fashion, whereby each channel pair contains one channel for the one transmission direction and one channel for the opposite transmission direction. The channels differ from one another in terms of time slot in a known manner.

As shown on the drawing, the channels that differ from one another in terms of time slot are individually sampled in succession at BX in time slot-suited terms. The channel-associated sub-information that are identified in time slot-associated terms (call-associated PCM words) that arrive at BX via the individual channels are supplied to two voice memories M0x and M1x in the X part interlaced in one another in terms of time slot on the common message path XE and are written into these two voice memories in time slot-oriented order. The two voice memories M0x and M1x therefore form a pair of time slot switching matrices, whereby the voice memory and 0x belongs to the X part and the voice memory M1x belongs to the Y part. These voice memories form a first pair of time slot switching matrices at whose input sides switch elements that can be occupied in a call-associated fashion are also connected in addition to the connector units and link connecting circuits allocated to the appertaining terminal group. These latter switch elements are respectively composed of a plurality of dial character receivers WE, Dial character transmitters WS, ringing signal transmitters R and call progress tone transmitters H. All of the switch elements that can be occupied in a call-associated fashion are respectively multiply provided. They are involved in the time slot-oriented allocation of the channels of the appertaining time-division multiplex at BX. Also included among the channels BX are those that are connected to the connector units and link connecting circuits of the same terminal group, as set forth above. The analogous case applies to the channels at CX of the communications transmission direction outgoing from the appertaining switching matrix sub-network.

The switching matrix sub-network of a terminal group also contains a second pair of time slot switching matrices that are realized by the voice memories M0y and M1y. At the input side with respect to the transmission direction, only the connector units and link connecting circuits allocated to the appertaining partner terminal group are connected to this second pair of time slot switching matrices, but none of the switch elements that can be occupied in a call-associated fashion are connected thereto; i.e. what are connected thereto are time-division multiplex connecting paths with which the connector units and the link connecting circuits of the respective partner terminal group are connectible in the switch-over mode.

Channel-associated sub-information (call-associated PCM words) can now be doubly written, namely in parallel, into each of the two switching matrix sub-networks of a respective pair of switching matrix sub-networks in concurrent time slots. A sub-information that, for example, is thus transmitted via the transmission path XE can therefore be written both into the voice memory M0x and into the voice memory M1x, namely in concurrent time slots. A sub-information that is transmitted via the transmission path YE likewise proceeds both into the voice memory M1y and into the voice memory M0y. To this end, the connector units and link connecting circuits allocated to the appertaining terminal group as well as the switch elements that can be occupied in a call-associated fashion are connected in time-division multiplex-oriented terms to both of the time slot switching matrices of the first pair, namely at the input side thereof, i.e. at the input side with respect to the communications transmission direction; only the connector units and link connecting circuits allocated to the appertaining partner terminal group are likewise connected in time-division multiplex-oriented terms to the input side of the two time slot switching matrices of the second pair.

Of each pair of time slot switching matrices, for example of the pair M0x/M1x, respectively one, for example the matrix M0x, has its output side, i.e. the output side in view of the communications transmission direction, connected to the connector units and link connecting circuits of the appertaining terminal group as well as the switch elements that can be occupied in a call-associated fashion. As may be seen from the drawing, therefore, one pair of voice memories M0x and M1x and a second pair of voice memories M0y/M1y are provided. Of each pair, a respective first voice memory, for example M0x and M0y, is connected to the connector units of its own terminal group in time-division multiplex-oriented terms.

Of each of the two pairs, a respective other, second voice memory, for example M1x and M1y, is connected to the connector units and link connecting circuits of the appertaining partner terminal group; these connections are updated in the situation of switch-over operation (see the German published application 3 717 387).

When reading the sub-information, the mentioned, first voice memories M0x and M0y of each of the two pairs is now driven in time slot-suited terms by a first holding memory CM0 assigned to this terminal group. Likewise, the two other voice memories are controlled in time slot-suited terms by a second holding memory CMI assigned to this terminal group when reading the sub-information. This occurs via control lines z1 and z2 or, respectively, $z+z1'$ and $z+z2'$. To this end, each of the two holding memories CM0 and CMI respectively controls the time slot-associated read events such that, per time slot, a corresponding sub-information is read either out of the one or out of the other of the appertaining two voice memories. When, for example, the holding memory CM0 controls a read event, then it thereby effects that the appertaining PCM word is read either out of the voice memory M0x or out of the voice memory M0y in time slot-suited fashion.

The channels that lead from and to the connector units and the link connecting circuits of its terminal group are thus connected to the X part of the switching matrix sub-network. The mentioned switch elements that can be occupied in a call-associated fashion are likewise connected to the X part of the switching matrix network. By contrast, the channels that lead from and to the connector units and link connector circuits of the partner terminal group are connected to the Y part.

The above-described arrangement of the voice memories in pairs and respectively doubly per voice memory pair enables a through-connection of PCM information between the X part and the Y part in both communications transmission directions without limitation. The read-out from the voice memories M0x or, respectively, M0y and M1x or, respectively, M1y is controlled in the described fashion by the settings of the separate holding memories CM0 and CM1. The holding memory CM0 controls the voice memories M0x and M0y and the holding memory CM1 controls the voice memories M1x and M1y when reading. The read-out event occurs similarly to the write-in event in time slot-suited terms, namely either in the one voice memory, for example the memory M0x or in the other voice memory M0y (or, respectively, M1x or M1y) dependent on the call information stored in the appertaining holding memory.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a circuit arrangement for centrally-controlled, time division multiplex telephone switching systems of the type in which a central switching matrix network serving for call through-connection together with a central processor serving for the control of the central switching matrix network are provided, in which a plurality of decentralized terminal groups is each equipped with a switching matrix sub-network constructed as a time stage for the external connection of links and subscriber lines and for internal connection of link connecting paths leading to switching matrix network terminals of the central switching matrix network, and each equipped with a decentralized control device for accepting switching characters from the lines, for pre-processing of switching characters and for forwarding switching characters to the central processor and for sending switching characters onto these lines, and in which the terminal groups are respectively allocated to one another in pairs by two's, and in which each of the connector units serving, on the one hand, for external connection of the subscriber and/or link lines and primarily connected to the switching matrix sub-network within the respective terminal groups can be connected, first of all, to link terminating circuits individually serving for the internal connection of the link connecting paths and likewise primarily connected to the switching matrix sub-network within the appertaining terminal group and, on the other hand, can be additionally connected, first externally and, secondly, internally to the switching matrix sub-network of the respective other terminal group, and vice versa, and in which, given a switching mode differing from separate operation of the appertaining two terminal groups for connections that respectively extend via a connector unit and via a link terminating circuit of the first or, respectively, second terminal group and via the switching matrix sub-network of the other terminal group, the corresponding processing of switching characters as well as the setting of the switching sub-matrix network is carried out by the decentralized control device with the assistance of switch elements including dial character receivers, dial character transmitters, ringing signal transmitters and call progress tone transmitters that can be occupied in a call-associated manner, the improvement therein comprising:

a first pair of time slot switching matrices including an input side for connection to the switch elements that can be occupied in a call-associated manner and in addition to the connector units and link connector circuits allocated to the appertaining terminal group;

a second pair of time slot switching matrices per terminal group including an input side connected only to the connector units and link connecting units allocated to the appertaining partner terminal group and not to the switch elements;

wherein channel-associated sub-information are doubly written in concurrent time slots, in particular in parallel into each of the two switching matrix sub-networks of a respective pair;

of each pair of time slot switching matrices, one includes an output connected to the connector units and link connector circuits of the appertaining terminal group and to the switch elements thereof that can be occupied in a call-associated manner and, when reading the subinformation, is controlled in a time slot-suited manner, and the respective other time slot switching matrix includes an output connected only to the connector units and link connecting circuits of the appertaining partner terminal group and, when reading subinformation, is controlled in a time slot-suited manner; and two holding memories connected to and respectively controlling the pair of time slot switching matrices during read events such that a corresponding subinformation per time slot is read either from the one or from the other of the appertaining, two switching matrix sub-networks.

* * * * *